Sept. 29, 1970 J. SCHRÖDER 3,531,768

CIRCUIT ARRANGEMENT FOR CALCULATING CONTROL CHARACTERS FOR SAFEGUARDING SERIES OF INFORMATION CHARACTERS

Filed Jan. 14, 1966

INVENTOR.
JÜRGEN SCHRÖDER
BY
Frank R. Trifari
AGENT

United States Patent Office 3,531,768

Patented Sept. 29, 1970

3,531,768

CIRCUIT ARRANGEMENT FOR CALCULATING CONTROL CHARACTERS FOR SAFEGUARDING SERIES OF INFORMATION CHARACTERS

Jürgen Schröder, Hamburg-Niendorf, Germany, assignor, by mesne assignments, to U.S. Philips Corporation, New York, N.Y., a corporation of Delaware Filed Jan. 14, 1966, Ser. No. 520,794
Claims priority, application Germany, Jan. 27, 1965, P 35,953
Int. Cl. G08c *25/00;* G06f *11/10;* H04l *1/10*
U.S. Cl. 340—146.1 3 Claims

ABSTRACT OF THE DISCLOSURE

A check circuit having a pulse source for generating a series of pulses in accordance with information characters, a modulo M counter responsive to said pulses, and a flip-flop responsive to the counter carry for causing said modulo M counter to double in response to said pulses.

With information to be handled and transmitted through lines increasing, it becomes increasingly necessary to timely detect faultily transmitted information in order to be able to recover it. For this purpose, control characters $P_1 \ldots P_K$ are associated with the information characters $Z_1 \ldots Z_m$ to be handled, which are calculated from the information characters according to a given rule so that the information is built up of character series (blocks) of the form $Z_1, Z_2, Z_3 \ldots Z_m, P_1 \ldots P_K$. The checking for errors of information safeguarded in this manner is effected so by calculating the control characters again and comparing with the associated control characters. When the two series of control characters do not correspond to each other, an error has occurred in the series of information signals and pilot signals.

Methods are known in which a pilot signal is calculated from the sum of numbers associated with the information characters to which respectively a weight is assigned dependent upon the location according to the rule that $$(1) \qquad P=\sum_{i=1}^{m} G_i \cdot Z_i \bmod M$$

in which $m$ is the number of information characters of the character series, $G_i$ the weight assigned to location $i$ in the character series, $Z_i$ the number associated with the character at the location $i$ independent of the location thereof, and M any integer number.

The invention is based on a method of determining the pilot signals in which the weights $G_i$ in Relation 1 are built up from powers of the radix 2.

$$(2) \qquad G_i = -2 \exp. (m+1-i) \bmod M$$

The circuit arrangement according to the invention, with which control characters for safeguarding series of information characters are calculated from the sum of numbers associated with the information characters to which respectively a weight is assigned which is dependent upon the location according to Relation 1, is characterized in that a pulse source is provided which is controlled by the information characters, the output of said source being connected to a cyclic modulo M counter in which M is any integer number and in which the pulse source supplies a number of pulses associated with each introduced information characters, means being provided which respond when the modulo M counter reaches the final position and which cause the pulses supplied by the pulse source after the modulo M counter has reached the final position each to displace the counter over two counter positions.

The technical realization of the calculating circuit consequently requires only a simple cyclic mod-M counter with an additional device which enables the counter position to be doubled.

In order that the invention may readily be carried into effect it will now be described in greater detail, by way of example, with reference to the accompanying drawing, in which.

Figure 1:
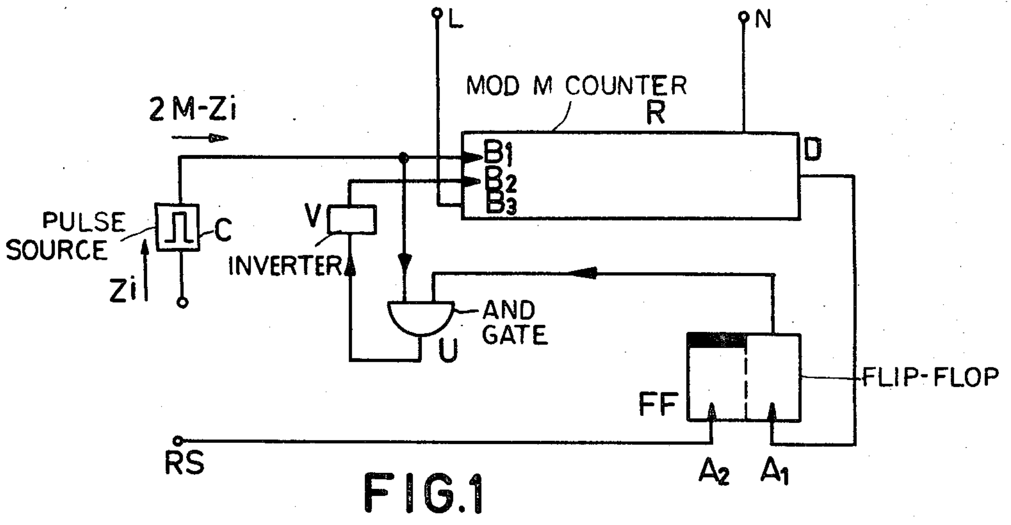
FIG. 1 is a block-schematic diagram of a circuit arrangement according to the invention.

The circuit arrangement shown in FIG. 1 comprises a known mod-M counter R, which can assume M different positions. After counting M pulses a carry pulse occurs at the output D. The circuit arrangement further comprises a pulse source C controlled by the information characters, a bistable flip-flop FF, an "AND" gate U and an inverter stage V controlled by said gate.

Figure 2:
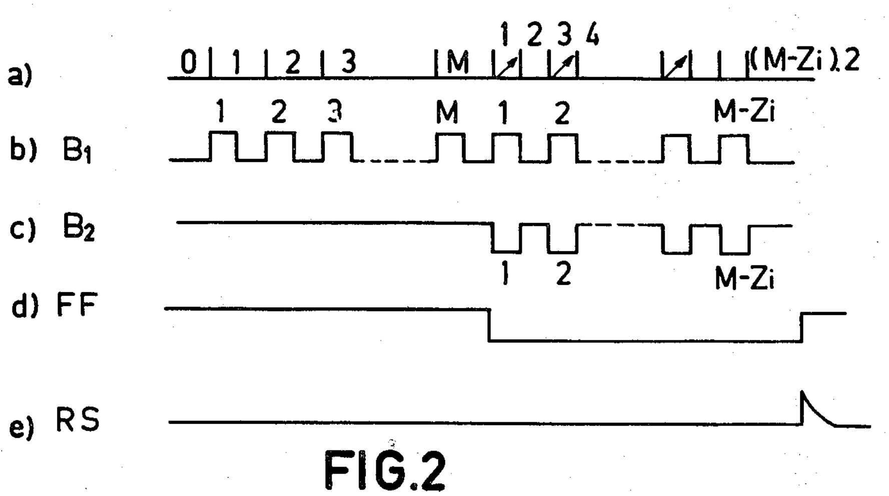
FIG. 2 shows a pulse diagram.

A control character is calculated as follows. When the $i^{th}$ information character of the character series is received, the pulse source C supplies a group of $2M-Z_i$ pulses to the input $B_1$ of the mod-M counter R (FIG. 2*b*). FIG. 2*a* shows the position of the counter associated with every counted pulse. If, for example, at the beginning the mod-M counter is in the zero position, the carry pulse occurring at the output D after M pulses and supplied to the input $A_1$ of the flip-flop FF causes the flip-flop circuit to change over (FIG. 2*d*). The AND-gate U is now opened for the next $M-Z_i$ pulses to be counted, as a result of which said pulses, after reversing the polarity, are supplied to the second input $B_2$ of the mod-M counter, through and gate U and inverter V in cascade (FIG. 2*c*). Since the inputs $B_1$ and $B_2$ of the counter respond to the leading edges of the pulses to be counted, each of the $M-Z_i$ pulses is counted twice so that after completion of the counting process the position $2(M-Z_i)=-2Z_i \bmod M$ is reached (FIG. 2*a*). If the number of counting steps $2(M-Z_i)$ exceeds M, another carry pulse appears at the output D and at the input $A_1$ of the flip-flops FF during the opening time of the AND-gate U which, however, does not influence the flip-flop circuit. After the completion of each counting process the flip-flop circuit FF must each time be brought in the rest condition by means of a resetting pulse through the line RS and the input $A_2$ (FIG. 2*e*). When the following information character is received, $2M-Z_{(i+1)}$ pulses are applied to the input $B_1$. The counting process runs off in an analogous manner as in handling the preceding characters, on the understanding that counting is continued now beginning by the counter position $-2Z_i \bmod M$. The counter R finally reaches the position $-(2Z_{(i+1)}+4Z_i)$. mod M. After handling $m$ characters, the control character calculated according to the Relations 1 and 2 is stored in the counter R and consequently is available for further handling. Before calculating a new control character the mod-M counter must be set in the zero condition; this is effected through an erasing line L.

The circuit arrangement further enables an easy checking for errors of a safeguarded character series. In this case the control character associated with the character series is also introduced in the counter. Because the counter position before introducing the control character is P and the introduced control character is applied to the counter as a group of $2M-P$ pulses, the counter reaches its zero position when the calculated and the introduced control character are equal. Said zero position can then be tested by a reading line connected to the output N. When the counter R now is not in the zero position, the output N supplies a signal which indicates that errors have occurred in a character series.

Figure 3:
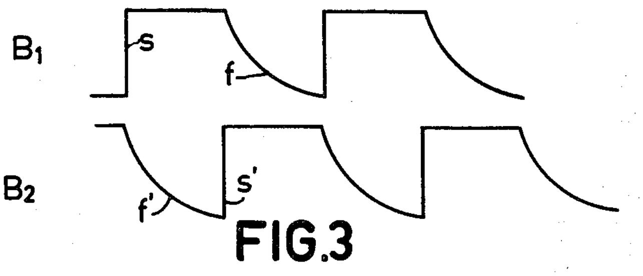
FIG. 3 shows the shape of the counting pulses.

Since the mod-M counter is provided with parallel inputs $B_1$ and $B_2$ it must be ensured that the two pulses to be counted which are received simultaneously with opposite polarities do not interfere with one another. When the circuit arrangement is proportioned suitably this may be reached, by causing the leading edge (S and S' resp.) in FIG. 3 to be steeper than the trailing edge (F and F' resp. in FIG. 3). Thus the leading edge of the pulse which initiates the counting process is not disturbed by the less steep trailing edge occurring simultaneously at the other input of the counter.

As an example of a circuit arrangement according to the invention may be mentioned a circuit with $M=11$ for safeguarding digit series of 10 digits (0, 1, . . . 9) with the weights: 2, 4, 8, 5, 10, 9, 7, 3, 6, 1, with which all single errors and all transposition errors can be detected.

What is claimed is:

1. A calculating circuit comprising a pulse source, means applying a plurality of information characters to said pulse source, a modulo M counter having a carry output, said pulse source supplying to a first input of said counter a group of pulses associated with said plurality of information characters thereby causing said counter to count, switching means connected to said carry output of said counter and responsive to the presence of a carry signal in the final position of said counter for generating a switching signal, and means responsive to said switching signal for gating pulses from the output of said pulse source to a second input of said counter, said first and second counter input responsive to the output of said pulse source and said switching means respectively for displacing the counter over two counter positions.

2. The combination of claim 1 wherein said switching means is a bistable flip-flop circuit having an input thereof coupled to the carry output of said modulo M counter and an output thereof coupled to one input of an AND gate having two inputs, the second input thereof being coupled to the output of said pulse source, the output of said AND gate being connected through an inverter to said second counter input.

3. The combination of claim 1 wherein the pulses applied simultaneously to the first and second inputs of the counter have alternately mutually different slopes.

References Cited

UNITED STATES PATENTS

| | | | |
|---|---|---|---|
| 3,007,115 | 10/1961 | Batley | 328—195 X |
| 3,319,078 | 5/1967 | Dunnet et al. | 307—262 X |
| 3,430,037 | 2/1969 | Renelt | 235—153 |
| 2,886,240 | 5/1959 | Linsman. | |

EUGENE G. BOTZ, Primary Examiner

R. S. DILDINE, Jr., Assistant Examiner

U.S. Cl. X.R.

235—153